April 9, 1940. A. MENZER 2,196,932
PRESSURE RESPONSIVE INDICATING INSTRUMENT
Filed July 2, 1938 2 Sheets-Sheet 1
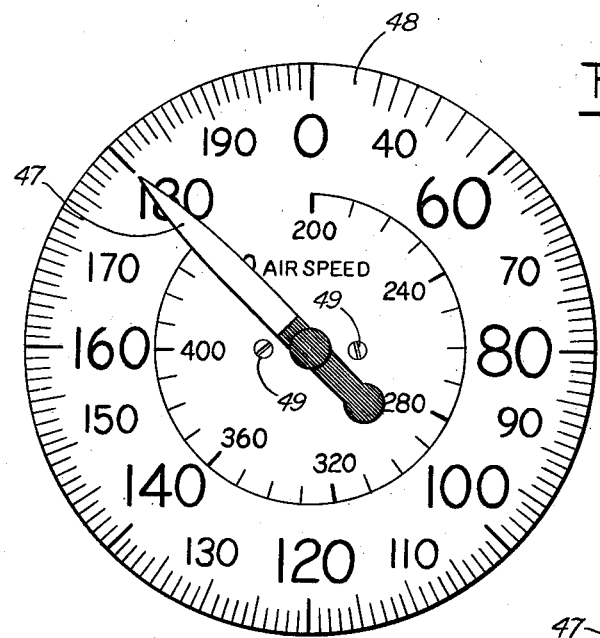
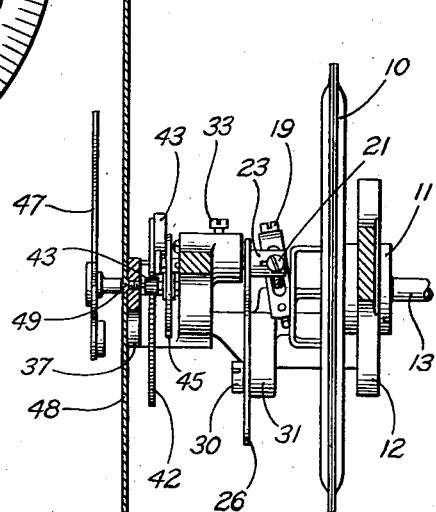
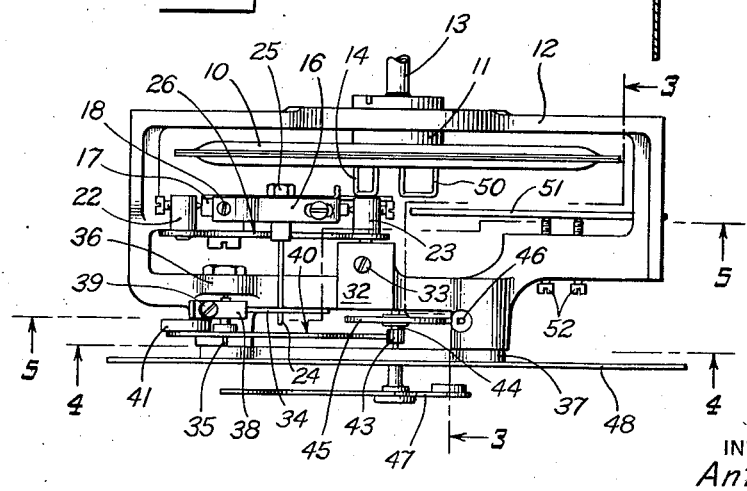
INVENTOR.
Anton Menzer
BY Stephen Cerstvik
ATTORNEY.

April 9, 1940.                A. MENZER                2,196,932
                PRESSURE RESPONSIVE INDICATING INSTRUMENT
                Filed July 2, 1938            2 Sheets-Sheet 2
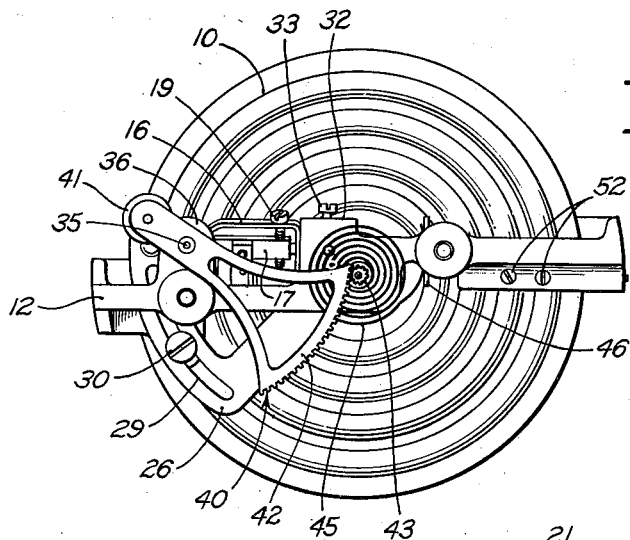
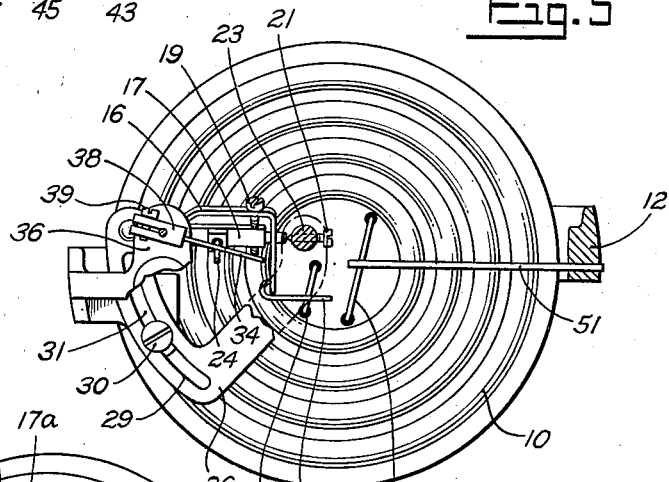
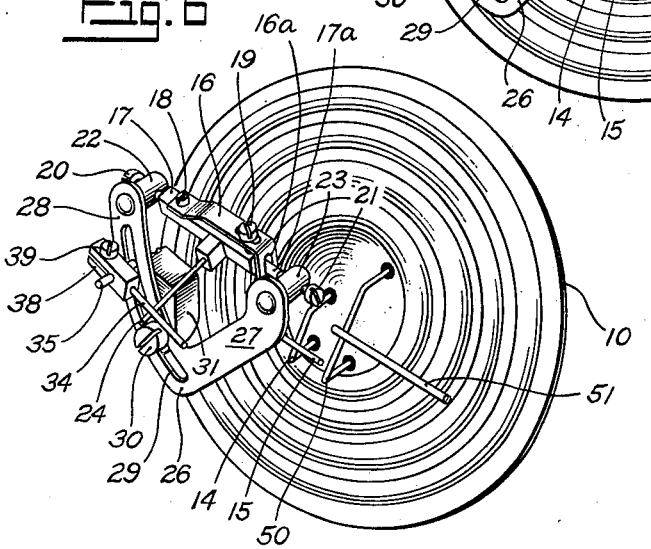
INVENTOR.
Anton Menzer
BY Stephen Cerstvik
ATTORNEY.

Patented Apr. 9, 1940

2,196,932

UNITED STATES PATENT OFFICE 2,196,932

PRESSURE RESPONSIVE INDICATING INSTRUMENT

Anton Menzer, Brooklyn, N. Y., assignor to Bendix Aviation Corporation, South Bend, Ind., a corporation of Delaware Application July 2, 1938, Serial No. 217,267

4 Claims. (Cl. 73—110)

The present invention relates to indicating instruments and more particularly to indicating instruments of the pressure actuated type such, for example, as aircraft airspeed indicators.

The invention embodies novel mechanism whereby the amplification of the movement of the pressure responsive element may be varied in amplitude and direction.

More specifically, the device embodying the invention is provided for the purpose of expediting the calibration of instruments such as airspeed indicators and the like, whereby interchangeable dials having similar scales thereon may be employed.

Similar devices of the prior art have been utilized in order to provide means for calibrating indicating instruments but such devices have been so complicated that calibration could be performed only by the most skillful manipulation of these devices, and the amount of time required to secure a proper calibration has been excessive.

In view of the above conditions prevailing in the prior art, one of the objects of the present invention is to provide a novel mechanism whereby the foregoing undesirable characteristics are eliminated.

Another object is to provide a mechanism for an indicating instrument embodying a novel rock-shaft mounting means.

A further object is to provide a novel mounting for a rock-shaft, including a rock-shaft arm whereby the plane of movement of the arm may be varied.

Still another object is to provide a novel mounting for a sector pin, whereby the angle at which contact takes place between the rock-shaft arm and the sector pin may be varied.

A further object is to provide novel means for mounting the connecting pin between the rock-shaft and the pressure actuated element, whereby the amplification of the movement produced by the pressure actuated element may be varied.

Still a further object of the invention is to provide in a speed indicating device, novel means for calibrating the mechanism to adjust the range of the scale characteristics thereof, whereby interchangeable dials having similar scales thereon may be employed.

The above and further objects and advantages of the invention will appear more fully hereinafter from a consideration of the detailed description which follows, taken together with the accompanying drawings wherein is illustrated one embodiment of the invention. It is to be expressly understood, however, that the drawings are for the purpose of illustration and description only and are not designed as a definition of the limits of the invention, reference primarily being had for this purpose to the appended claims.

In the drawings, wherein like reference characters refer to like parts throughout the several views:

Fig. 1 is a front view of one type of instrument embodying the present invention and shown as an aircraft airspeed indicator;

Fig. 2 is a side elevation of the instrument, in inverted position, illustrating the arrangement and functional relation of the elements of the whole mechanism of the instrument;

Fig. 3 is a longitudinal section taken on line 3—3 of Fig. 2 and rotated 90 degrees clockwise;

Fig. 4 is a transverse section taken along line 4—4 of Fig. 2;

Fig. 5 is a transverse section taken along line 5—5 of Fig. 2; and

Fig. 6 is a view in perspective illustrating the arrangement and functional relationship of the novel elements embodying the present invention.

Referring to the drawings and more particularly to Fig. 2, the instrument embodying the present invention is shown in the form of an air-speed indicator having a pressure responsive diaphragm 10 brazed or otherwise secured to a supporting member in the form of an apertured boss 11 fastened to the instrument frame 12 in any desired manner. A conduit 13 is connected to the aperture of the boss 11 by soldering or otherwise connecting the conduit to the boss so that a passage is formed between the interior of the diaphragm and a pitot-static tube (not shown) suitably mounted on the craft.

A U-shaped member 14 (see Fig. 6) is connected to the diaphragm on the upper surface thereof and provides means whereby the movement of the diaphragm is transmitted to a rod 15 near one end thereof, the other end of said rod 15 being fastened to a spring mounting element as will be described later in detail.

The novel means of the present invention comprise in part, an L-shaped spring element 16 fastened at one end of the long side thereof to a rock-shaft 17 by a screw 18. Fastened to the short end of the spring element is the rod 15 coacting with the U-shaped member 14 of the diaphragm and serving as a connecting link between the rock-shaft and the diaphragm, whereby the reciprocating movement of the diaphragm may be transformed into movement of rotation of the rock-shaft. Spring element 16 is displaced from the rock-shaft 17 throughout the greater part of its length as shown in Figs. 4, 5 and 6, and a threaded bolt 19 passes through the spring element and cooperates with a threaded opening in the rock-shaft, whereby the spring element may be urged towards the rock-shaft against the resilient opposition of the spring. Spring element 16 is slotted as shown at 16a in Fig. 6 so that the element can be mounted in line with the supports for the rock-shaft as set out in detail later. By adjustment of the bolt 19, the effective distance between the rock-shaft and the diaphragm rod 14 may be varied in order to vary the amplification of movement due to the movement of the diaphragm 10. Upon the adjustment of bolt 19, the effective lever arm is varied, but once varied, the resilient force of the spring element coacting with the head of the bolt 19 maintains the effective lever arm at the desired length.

Rock-shaft 17 is pivotally mounted for rotation about the threaded pivots 20 and 21, respectively, provided in posts 22 and 23 which are mounted as described in detail below, the pivot 21 cooperating with rock-shaft extension 17a passing through the slot 16a of spring element 16 so that said spring element can be moved in the plane of pivots 20 and 21.

Mounted on the rock-shaft 17 for rotation therewith is the rock-shaft arm 24 fastened to the rock-shaft by the nut 25, see Fig. 2, coacting with the threaded end of arm 24 passing through the rock-shaft.

The novel means of the present invention further comprise in part, a V-shaped rock-shaft adjustment frame 26 having arms 27 and 28, the arm 27 being integrally connected to the post 23 while the arm 28 carries at one end thereof the post 22 which serves as a support for the pivot 20 as described above. A slot 29 is cut into the arm 28 to receive a bolt 30 passing through the slot and threadedly engaging with a boss 31 on the instrument frame 12.

The post 23 to which the rock-shaft adjustment frame is integrally connected is rotatably mounted in a journal formed in the boss 32, see Fig. 2. A bolt 33 threaded through the boss 32 engages the post 23 to lock the same in any desired relative position thereof. By loosening the bolts 33 and 30, the rock-shaft frame may be rotated about the post 23 as a pivot to thereby bodily rotate the rock-shaft whereby the plane of movement of the rock-shaft arm 24 may be varied as desired. The bolts 30 and 33 are then screwed down to lock respectively the arm 28 of the rock-shaft frame and the post 23 to which the frame is integrally connected whereby the frame is then held in the desired adjusted position.

The novel means of the present invention still further comprise in part the sector pin 34 mounted for rotation about shaft 35 journaled at one end thereof in lug 36 projecting from the instrument frame 12 as shown in Fig. 2, while at the other end thereof shaft 35 is journaled in arm 37 carried by the instrument frame 12 in spaced relation thereto. Sector pin 34 is adjustably mounted on shaft 35 by means of fingers 38 extending on both sides of the shaft so that the angular position of the sector pin with respect to the shaft 35 may be varied. A bolt 39 threadedly passes through the fingers to clamp the sector pin in the desired angular position. By adjustment of the position of the sector pin, the particular point in the expansion of the diaphragm 10 at which the rock-shaft arm 24 contacts the sector pin 34 may be predetermined.

Also mounted on shaft 35 for rotation therewith is the gear sector 40 (see Fig. 4) comprising the counterweight 41 and the toothed section 42 meshing with pinion 43. Pinion 43 is mounted for rotation with shaft 44, see Fig. 2, journaled at one end in the instrument frame 12 and near the other end in the arm 37. Hair spring 45 is connected at one end thereof to the shaft 44 and is rigidly fastened in an opening in the instrument frame at the other end thereof by means of a pin 46 as shown in Fig. 4. The hair spring 45 provides means whereby the back-lash between the pinion 43 and the remainder of the mechanism may be taken off.

A pointer 47 is connected at the outer end of the shaft 44 for rotation therewith for movement over the graduated dial 48 which is fastened by means of screws 49 to the arm 37.

Also mounted on the diaphragm 10 is a second U-shaped member 50 which coacts with stop-arm 51 mounted in the instrument frame 12. The stop-arm determines the limit of expansion of the diaphragm and, therefore, the limit of the number of revolutions of the pointer 47 which in the instrument illustrated makes two complete revolutions. A series of threaded bolts 52 as shown in Fig. 2 pass through the frame 12 and abut the stop-arm 51 in order to vary the effective position thereof.

The operation of the device is as follows:

By means of the conduit 13, the pressure within the diaphragm is varied as a function of the airspeed of the craft upon which the mechanism is mounted.

Upon an expansion of the diaphragm, the U-shaped member 14 actuates the rod 15 to thereby rotate the rock-shaft 17 about its pivots 20—21. Rotation of the rock-shaft causes movement of the rock-shaft arm 24 which in turn actuates the sector pin 34 to thereby rotate the shaft 35. Rotation of shaft 35 produces rotation of the sector 40 to rotate the pinion 43. Pinion 43 in turn rotates the shaft 44 to move the pointer 47 over the scale 48 to thereby indicate, by its relative position, the movement of the diaphragm and therefore the value of the air speed of the craft.

Since movement of the diaphragm 10 is not a straight line function of the airspeed, the transmission means between the diaphragm and the pointer must include means whereby the transmission can be modified in order that the movement of the diaphragm will produce movement of the pointer coinciding with the required graduation on the dial.

By means of the resilient mounting on the rod 15, the effective lever arm between the rock-shaft and the point of application of the diaphragm movement may be varied whereby the amplification of movement of the diaphragm is altered as desired.

By means of the adjustable mounting of the rock-shaft frame 26, the plane of movement of rock-shaft arm 24 may be varied whereby the transmission of the movement of the diaphragm to the pointer can be modified as desired. For example, upon rotation of the rock-shaft frame, the rock-shaft arm 24 may be made to intercept the sector pin 34 at right angles thereto with little or no sliding movement thereover upon actuation of the sector pin by the rock-shaft arm. On the other hand, the rock-shaft arm may be so adjusted by rotation of the rock-shaft frame that the plane of movement of the rock-shaft arm is such that arm 24 slides over pin 34 to produce a modified cam action therewith. By variation of the position of the rock-shaft frame therefore, the distribution of the movement of the pointer over the dial may be varied until the mechanism is calibrated to the graduations indicated on the dial.

By means of the adjustable mounting of the sector pin 34, the particular point of expansion of the diaphragm at which arm 24 contacts the sector pin may be varied, whereby the zero point of the pointer on the dial may be adjusted and the particular characteristics of the expansion of the diaphragm can be coordinated with the graduations on the dial.

Novel means are therefore provided whereby the amplification of the movement of the diaphragm may be varied and whereby the movement of the diaphragm as conveyed to the pointer is so modified that the movement of the diaphragm will cause such a movement of the pointer that the position of the pointer is properly coordinated with the graduations on the dial.

Although but one embodiment of the invention has been illustrated and described, other changes and modifications in form, material and relative arrangements of parts, which will now appear to those skilled in the art, may be made without departing from the scope of the invention. Reference is therefore to be had to the appended claims for a definition of the limits of the invention.

What is claimed is:

1. An indicating instrument comprising means movable in response to changes in pressure, a rock-shaft rotatably mounted adjacent said pressure responsive means, means connecting said rock-shaft and said pressure responsive means, comprising an adjustable resilient lever arm whereby the effective lever arm between said rock-shaft and said pressure responsive means may be varied, a frame for supporting said rock-shaft, an arm on said rock-shaft mounted for movement therewith in a desired plane, an axle, a sector mounted on said axle, means connecting said axle and said arm comprising a sector pin mounted on said axle, means for adjusting the angular position of said pin and axle, a pinion meshing with said sector, a shaft rotated by said pinion, a pointer on said shaft and a graduated dial mounted in position to cooperate with said pointer whereby movement of said pointer over said dial will be indicative of the position of the pressure responsive means, and means for adjustably rotating said rock-shaft frame whereby the plane of rotation of said rock-shaft arm may be varied so that the movement of said pointer over said dial is adjustably modified.

2. In a device of the character described, a diaphragm, means extending from said diaphragm, a rock-shaft, pivots at the end of said rock-shaft supporting the same for rotative movement about the axis of said pivots, a frame carrying said pivots, a post connected to and supporting said frame, means mounting said post for rotative movement, means for locking said frame in any desired relative position thereof, and means connecting said rock-shaft and said diaphragm extension means, said connecting means comprising a spring fastened at one end to said rock-shaft and aligned therewith, an offset in said spring whereby said spring is maintained in spaced relation to said rock-shaft, and means cooperating with said rock-shaft and spring whereby said spaced relation may be varied in order to adjust the effective lever arm between said diaphragm extension means and said rock-shaft.

3. In a device of the character described, a diaphragm, a rock-shaft, an adjustable spring arm connecting said rock-shaft and said diaphragm, pivots at the end of said rock-shaft supporting the same for rotative movement about the axis of said pivots, a frame carrying said pivots, a post connected to and supporting said frame, means mounting said post for rotative movement, means for locking said frame at any desired relative position thereof, a rock-shaft arm, an auxiliary shaft, a pointer, means on said auxiliary shaft for actuating said pointer, and means connecting said shaft and said rock-shaft arm, said connecting means comprising a lever arm adjustably and rotatably mounted on said shaft whereby the point at which said arm contacts said lever arm upon expansion of said diaphragm may be adjusted.

4. A device of the character described, comprising a diaphragm, a rock-shaft, pivots located at the ends of said rock-shaft for rotatably mounting the same about the axis of said pivots, a frame having legs forming a V-shaped element, means connected to one leg of said element for supporting one of said pivots, and means connected to the other of said legs for supporting the other of said pivots, said last-named means comprising a post mounted for rotation whereby the entire frame and rock-shaft is rotated therewith, a slot in the first-named leg, and a member extending through said slot whereby said frame may be locked at any desired rotative position thereof.

ANTON MENZER.